(12) United States Patent
Jin et al.

(10) Patent No.: US 7,990,861 B1
(45) Date of Patent: Aug. 2, 2011

(54) SESSION-BASED SEQUENCE CHECKING

(75) Inventors: Xiangdong Jin, Albany, CA (US);
Dongping Luo, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1416 days.

(21) Appl. No.: 11/278,475

(22) Filed: Apr. 3, 2006

(51) Int. Cl.
*G01R 31/08* (2006.01)
*G01F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*G06F 15/16* (2006.01)

(52) U.S. Cl. ............ 370/231; 370/229; 370/230.1; 370/235; 709/235

(58) Field of Classification Search .......... 370/394
See application file for complete search history.

(56) References Cited

U.S. PATENT DOCUMENTS

| | | | |
|---|---|---|---|
| 6,205,498 B1 * | 3/2001 | Habusha et al. | 710/29 |
| 7,257,840 B2 * | 8/2007 | Ramaiah et al. | 726/22 |
| 2001/0051865 A1 * | 12/2001 | Kerr et al. | 703/27 |
| 2003/0125056 A1 * | 7/2003 | Jiang | 455/466 |
| 2004/0184337 A1 * | 9/2004 | Jakobs | 365/222 |
| 2005/0005024 A1 * | 1/2005 | Samuels et al. | 709/238 |
| 2005/0039104 A1 * | 2/2005 | Shah et al. | 714/776 |
| 2005/0041586 A1 * | 2/2005 | Jiang | 370/236 |
| 2005/0060442 A1 * | 3/2005 | Beverly et al. | 710/33 |
| 2005/0182841 A1 * | 8/2005 | Sharp | 709/228 |

OTHER PUBLICATIONS

Internet Engineering Task Force (IETF) "RFC 793: TCP Protocol Specification" Sep. 1981.*
Internet Engineering Task Force (IETF) "RFC 2001: TCP Slow Start, Congestion Avoidance, Fast Retransmit." Jan. 1997.*
Internet Engineering Task Force (IETF) "RFC 2018: Selective Acknowledgment Options." Oct. 1996.*
Internet Engineering Task Force (IETF) "RFC 1323: TCP Extensions for High Performance." May 1992.*

* cited by examiner

*Primary Examiner* — Ayaz R Sheikh
*Assistant Examiner* — Tarell Hampton
(74) *Attorney, Agent, or Firm* — Harrity & Harrity, LLP

(57) ABSTRACT

A device may include logic configured to receive a data unit intended for a destination device and to obtain information from the data unit. The logic may be configured to identify a window using the obtained information, where the window has a range determined by a lower boundary and an upper boundary. The logic may be configured to forward the data unit to the destination device when a portion of the data unit information is within the window.

14 Claims, 6 Drawing Sheets

320

| | 410 | 415 | 420 | 425 | 430 | 435 | 440 | 445 |
|---|---|---|---|---|---|---|---|---|
| TIME | $A_N$ | $W_N$ | $M_N$ | $A_{N'}$ | $W_{N'}$ | $M_{N'}$ | SF |
| 345 | 345 | 25 | 30 | 120 | 14 | 25 | 0 |
| 350 | 345 | 25 | 30 | 121 | 40 | 40 | 0 |
| 355 | 345 | 25 | 30 | 121 | 40 | 40 | 4 |
| 360 | 345 | 25 | 30 | 121 | 40 | 40 | 2 |
| 365 | 345 | 25 | 30 | 121 | 40 | 40 | 3 |
| 370 | 345 | 25 | 30 | 121 | 40 | 40 | 0 |
| 375 | 345 | 25 | 30 | 121 | 40 | 40 | 0 |
| 380 | 355 | 15 | 30 | 121 | 40 | 40 | 0 |
| 385 | 355 | 15 | 30 | 130 | 15 | 40 | 0 |

CLIENT 110 SIDE     SERVER 140 SIDE

| TIME | SENDER | SEQ# | DATA UNIT LENGTH | ACK # | WIN SIZE | SEQ CHECK RESULT | UPDATE SESSION TABLE? |
|---|---|---|---|---|---|---|---|
| | | | | | | | |
| 350 | CLIENT | 349 | 4 | 121 | 40 | PASS | YES |
| 355 | CLIENT | 343 | 15 | 119 | 20 | PASS | NO |
| 360 | CLIENT | 200 | 12 | 112 | 29 | FAIL | NO |
| 365 | CLIENT | 344 | 15 | 180 | 20 | FAIL | NO |
| 370 | CLIENT | 344 | 50 | 121 | 20 | FAIL | NO |
| 375 | SERVER | 118 | 20 | 344 | 15 | PASS | NO |
| 380 | SERVER | 128 | 10 | 354 | 15 | PASS | YES |
| 385 | CLIENT | 359 | 10 | 130 | 15 | PASS | YES |
| | | | | | | | |

FIG. 5

SESSION-BASED SEQUENCE CHECKING

FIELD OF THE INVENTION

Implementations consistent with the principles of the invention relate generally to network communication and, more particularly, to techniques that can be used to validate data units exchanged between a source and destination during a communication session.

BACKGROUND

In networked applications, devices may exchange packets as part of a communication session. For example, a client device may send a packet to a destination device, such as a server, as part of the communication session. Devices participating in the communication session may use source addresses, destination addresses, and/or other identifiers, such as sequence numbers, to ensure that packets arrive at an intended destination.

Sequence numbers may be used to identify packets that arrive at a destination device. For example, a destination device may expect arriving packets to have sequence numbers within a certain range, such as a 32 bit range. These sequence numbers may be configured to increase with each subsequent packet sent from a source device to a destination device. As a result, the destination device may use sequence numbers to order packets, such as when packets arrive out of order.

Assume that a destination device expects sequence numbers to fall within a fixed window centered at a certain value, such as a 32 kilobyte window that is centered at a certain value. Sequence numbers within this window may be considered valid sequence numbers by the destination device. As a result, the destination device may accept packets having legitimate sequence numbers and may reject packets having sequence numbers outside the window.

Adversaries may attempt to guess sequence numbers that are within the window when attempting to send illegitimate traffic to a destination, such as when launching a denial of service attack. An adversary may continue to guess sequence numbers until it guesses a sequence number that is within the window which may cause the destination device to accept a packet having the correctly guessed sequence number. The adversary may then send a large number of packets to the destination device in an attempt to overwhelm the destination device once the destination device accepts a packet from the adversary.

Communication sessions may be less prone to intrusion when adversaries cannot easily guess a valid sequence number.

SUMMARY

In accordance with an aspect, a device is provided. The device may include logic configured to receive a data unit intended for a destination device and to obtain information from the data unit. The logic may be configured to identify a window using the obtained information, where the window has a range determined by a lower boundary and an upper boundary. The logic may be configured to forward the data unit to the destination device when a portion of the data unit information is within the window.

In accordance with another aspect, a method is provided. The method may include receiving a data unit on behalf of a destination device and obtaining information associated with the data unit, the destination device or a source device. The method may include establishing a range having a lower boundary and an upper boundary using the obtained information and determining, on behalf of the destination device, whether information associated with the data unit is in the range. The method may include forwarding the data unit to the destination device when the information associated with the data unit is in the range.

In accordance with yet another aspect, a network device is provided. The network device may include means for receiving a data unit on behalf of a destination device and means for obtaining information about the data unit. The network device may include means for obtaining information about the destination device or a source device that sent the data unit and means for establishing a range having a lower boundary and an upper boundary using the information about the data unit, the destination device or the source device, where the range is configured to change based on the information about the data unit, the destination device or the source device. The network device may include means for determining whether a sequence number for the data unit is within the range and means for forwarding the data unit to the destination device when the sequence number is within the range.

In accordance with still another aspect, a device is provided. The device may include logic to establish a lower limit using information from a session table and a data unit and to establish an upper limit using information from the session table and the data unit. The logic may determine whether a sequence number for the data unit is between the lower limit and the upper limit and may forward the data unit to a destination when the sequence number is between the lower limit and the upper limit.

BRIEF DESCRIPTION OF THE DRAWINGS

The accompanying drawings, which are incorporated in and constitute a part of this specification, illustrate implementations of the invention and, together with the description, explain the invention. In the drawings.

FIG. 4 illustrates an exemplary session table that can be implemented via a data structure in a memory of a network device consistent with the principles of the invention;

FIG. 5 illustrates an exemplary data unit table that can be used to store information about data units related to a communication session consistent with the principles of the invention.

DETAILED DESCRIPTION

The following detailed description of implementations consistent with the principles of the invention refers to the accompanying drawings. The same reference numbers in different drawings may identify the same or similar elements.

Also, the following detailed description does not limit the invention. Instead, the scope of the invention is defined by the appended claims and their equivalents.

Exemplary implementations consistent with principles of the invention may use information related to data units exchanged during a communication session to perform sequence number checking. Techniques used to perform sequence number checking, consistent with the principles of the invention, may prevent unauthorized data units from being accepted by a destination as legitimate data units. For example, in one implementation, a window is determined with respect to sequence numbers that will be considered as legitimate by devices participating in a legitimate communication session. Parameters of the window, such as a lower limit, upper limit, and center value, may be determined using information related to data units exchanged between devices in the communication session and/or information related to a source device or a destination device participating in the communication session. The window parameters may be identified via comparison techniques performed using the data unit information, source device information, or destination device information. Implementations of the window may be configured to make it difficult for an adversary to guess a sequence number that falls within the lower limit or upper limit of the window. As a result, an adversary may be unlikely to have its data units mistakenly considered as legitimate data units by a destination device or a device operating on behalf of the destination, such as an intermediate network device.

A "data unit," as used herein, may refer to any type of machine-readable data having substantially any format that may be adapted for use in one or more networks, such as a public network and/or private network. A data unit may include packet data and/or non-packet data.

First Exemplary Implementation

Figure 1:
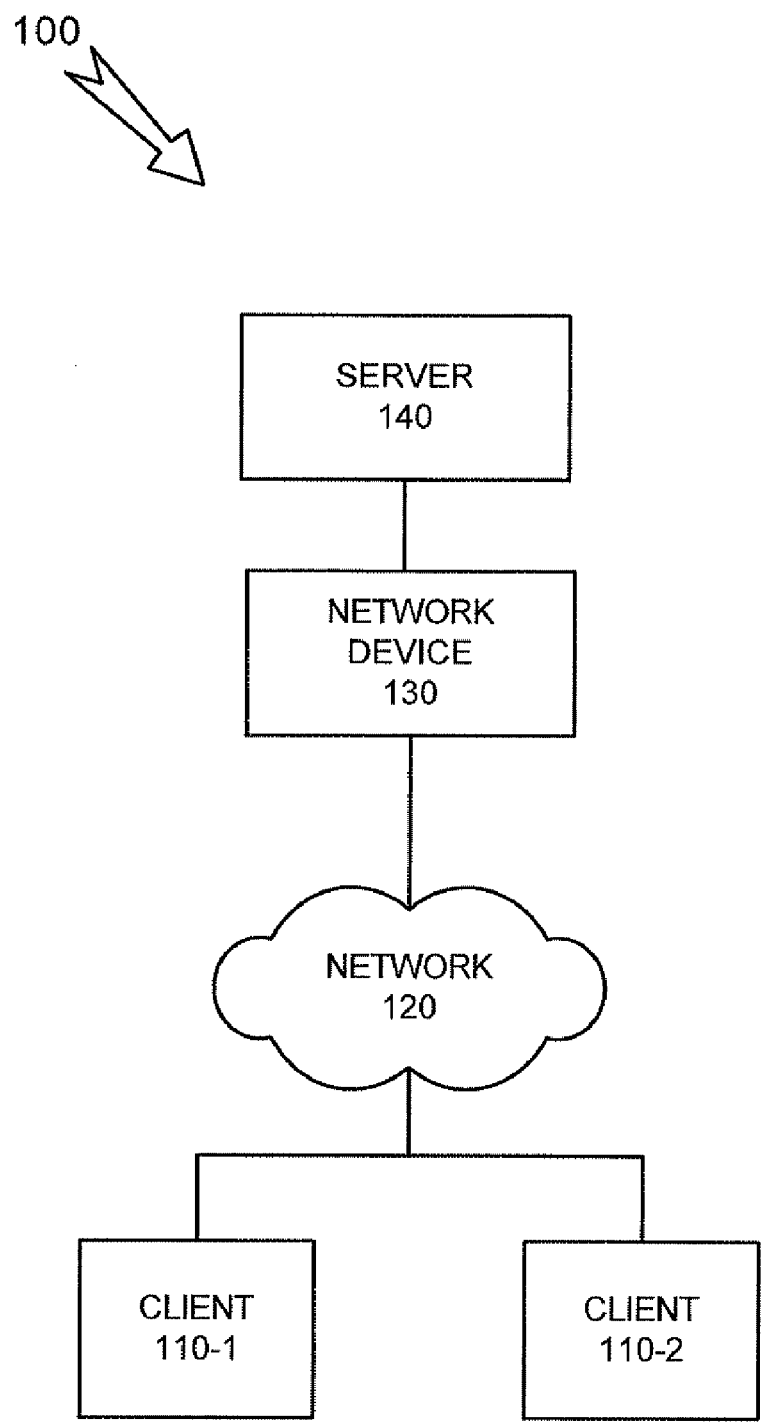
FIG. 1 is a diagram of an exemplary network in which systems and methods consistent with the principles of the invention may be implemented.

FIG. 1 is a diagram of an exemplary network 100 in which systems and methods consistent with the principles of the invention may be implemented. Network 100 may include, among other things, a client 110-1 and 110-2 (hereinafter, collectively client 110), a network 120, a network device 130, and a server 140. While network 100 is shown to include a particular number and arrangement of elements for simplicity, network 100 may include fewer, more, different, or differently arranged elements in other implementations consistent with the principles of the invention. For example, network device 130 may be located between client 110 and network 120.

Client 110 may include a device configured to send a data unit to a destination device, such as server 140, and/or to receive a data unit from the destination device. Clients 110-1 and 110-2 may represent subscribers of communication services provided by server 140. Client 110 may include a desktop computer, a laptop computer, a personal digital assistant (PDA), a web enabled cellular telephone, a wireless fidelity (Wi-Fi) device, or another type of device that is operated by a user to communicate with a destination device, such as server 140. Client 110 may communicate with other devices, such as other clients, network device 130 and/or server 140, by sending, for example, data units, such as packets. In one implementation, client 110-1 and client 110-2 may both communicate with a destination device at substantially the same time.

Network 120 may include a network, or combination of networks, capable of transporting data units. For example, network 120 may include a local area network (LAN), a metropolitan network (MAN), or a wide area network (WAN), such as the Internet. Network 120 may include hard-wired connections, such as shielded twisted pairs, coaxial cables, optical fibers, and/or waveguides. Alternatively, network 120 may include wireless links, such as free space optical links, and/or free space acoustic links. Network 120 may operate using substantially any protocol, such as asynchronous transfer mode (ATM), synchronous optical transport (Sonet), Internet Protocol (IP), a switched protocol, such as a protocol compatible with a public switched telephone network (PSTN), or Bluetooth.

Network device 130 may include a device capable of receiving a data unit via a network. In one implementation, network device 130 may include an in-line device operating as an edge device between a first network and a destination device that may be operating on a second network. For example, network device 130 may operate as an edge device between an untrusted network, such as the Internet, and a trusted network, such as a corporate LAN. "Inline network device" may refer to any network device operating in a manner whereby all, or substantially all, data units intended for a destination device pass through the network device before reaching the destination device. Network device 130 may include one or more devices such as routers, gateways, firewalls, switches, and/or servers. For example, network device 130 may operate as a router in cooperation with server 140 to provide communication services to a number of subscribers, such as client 110-1 and 110-2. Server 140 may operate on a secure network (not shown) and may pass data units through network device 130 to an unsecure network (e.g., network 120) on which client 110 is operating. Network device 130 may be configured to monitor data units passing through network device 130 to a destination and to store information about the monitored data units in a memory.

In one implementation, network device 130 may maintain information on behalf of client 110 and server 140. For example, network device 130 may maintain a session table that includes information about client 110 and server 140. The session table may be used by network device 130 to establish a communication session between client 110 and server 140. Network device 130 may identify legitimate data units by using information associated with client 110 and server 140. Network device 130 may operate in a trusted relationship with one device, such as server 140, and in an untrusted relationship with another device, such as client 110.

Server 140 may include a device capable of receiving a data unit from and transmitting a data unit to another device and/or network. For example, server 140 may include a workstation, desktop computer, laptop computer, PDA, web enabled cellular telephone, Wi-Fi device, or another type of device. In exemplary implementations described herein, server 140 may operate as a destination device by receiving one or more data units from client 110 via an intermediate device, such as network device 130. For example, server 140 may provide a service to other devices on network 100, such as client 110.

Client 110 may communicate with network device 130 and/or server 140 using connections associated with a primary data network, such as network 120. Alternatively, client 110 may communicate with network device 130 and/or server 140 using a dedicated network and/or link. A link may be a dedicated physical or virtual link and may include encryption protocols for protecting the content of communications between client 110 and a destination device, such as network device 130 and/or server 140.

Exemplary Block Diagram

Figure 2:
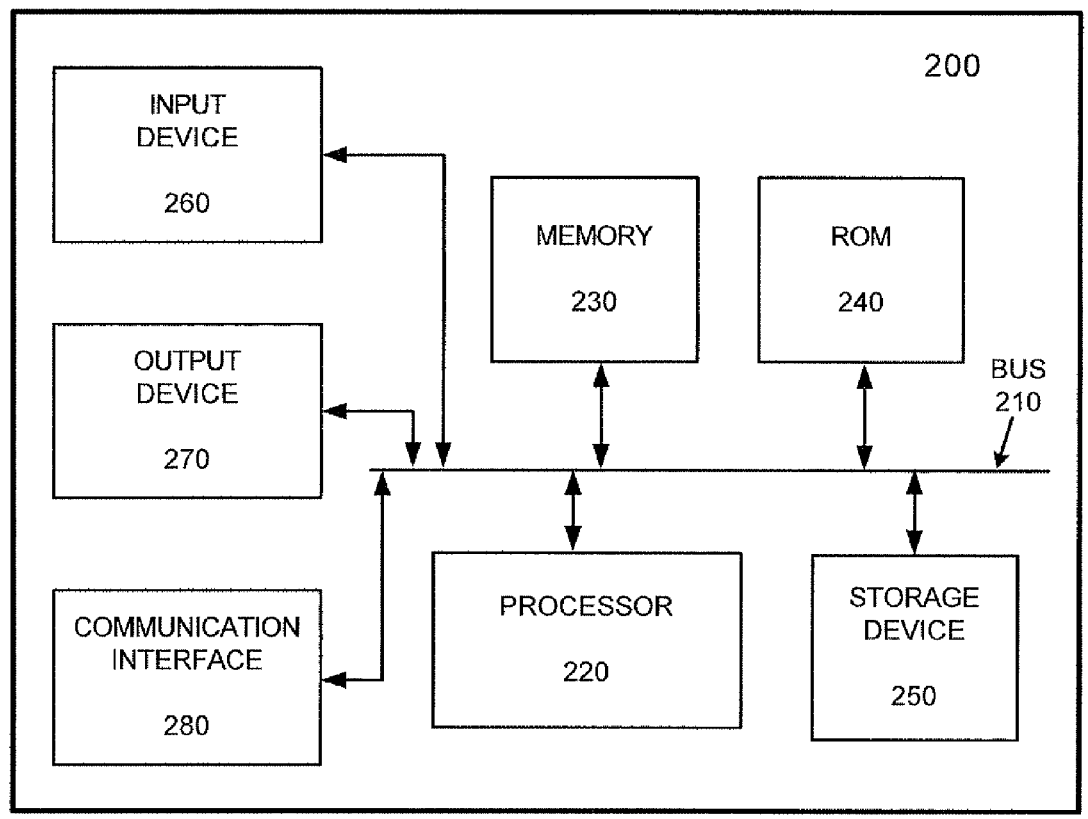
FIG. 2 illustrates an exemplary block diagram of a computing device, such as a client, network device, or server, according to an implementation consistent with the principles of the invention.

FIG. 2 is an exemplary block diagram of a computing device 200, which may represent one of clients 110, network device 130, server 140 or another network device, such as a firewall, edge router, core router, gateway, etc. Computing device 200 may include a bus 210, a processor 220, a main memory 230, a read only memory (ROM) 240, a storage device 250, an input device 260, an output device 270, and a communication interface 280. Processor 220 may include processors, microprocessors, or processing logic that interpret and execute instructions. Main memory 230 may include a random access memory (RAM) or another type of dynamic storage device that stores information and instructions for execution by processor 220. ROM 240 may include a ROM device or another type of static storage device that stores static information and instructions for use by processor 220. Storage device 250 may include a magnetic and/or optical recording medium and its corresponding drive.

Input device 260 may include any mechanism or combination of mechanisms that permit computing device 200 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables computing device 200 to communicate with other devices and/or systems. For example, communication interface 280 may include mechanisms for communicating with another device or system via a network, such as network 120.

Computing device 200 may implement a number of functions, described in more detail below, using software instructions read into memory 230 from another computer-readable medium, such as data storage device 250, or from another device via communication interface 280. The software instructions contained in memory 230 may cause processor 220 to perform processes that will be described later. More particularly, as mentioned above, the software instructions contained in memory 230 may be configured to cause processor 220 to implement sequence number checking with respect to data units passing through network device 130 en route to a destination, such as server 140. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Exemplary Functional Diagram

Figure 3:
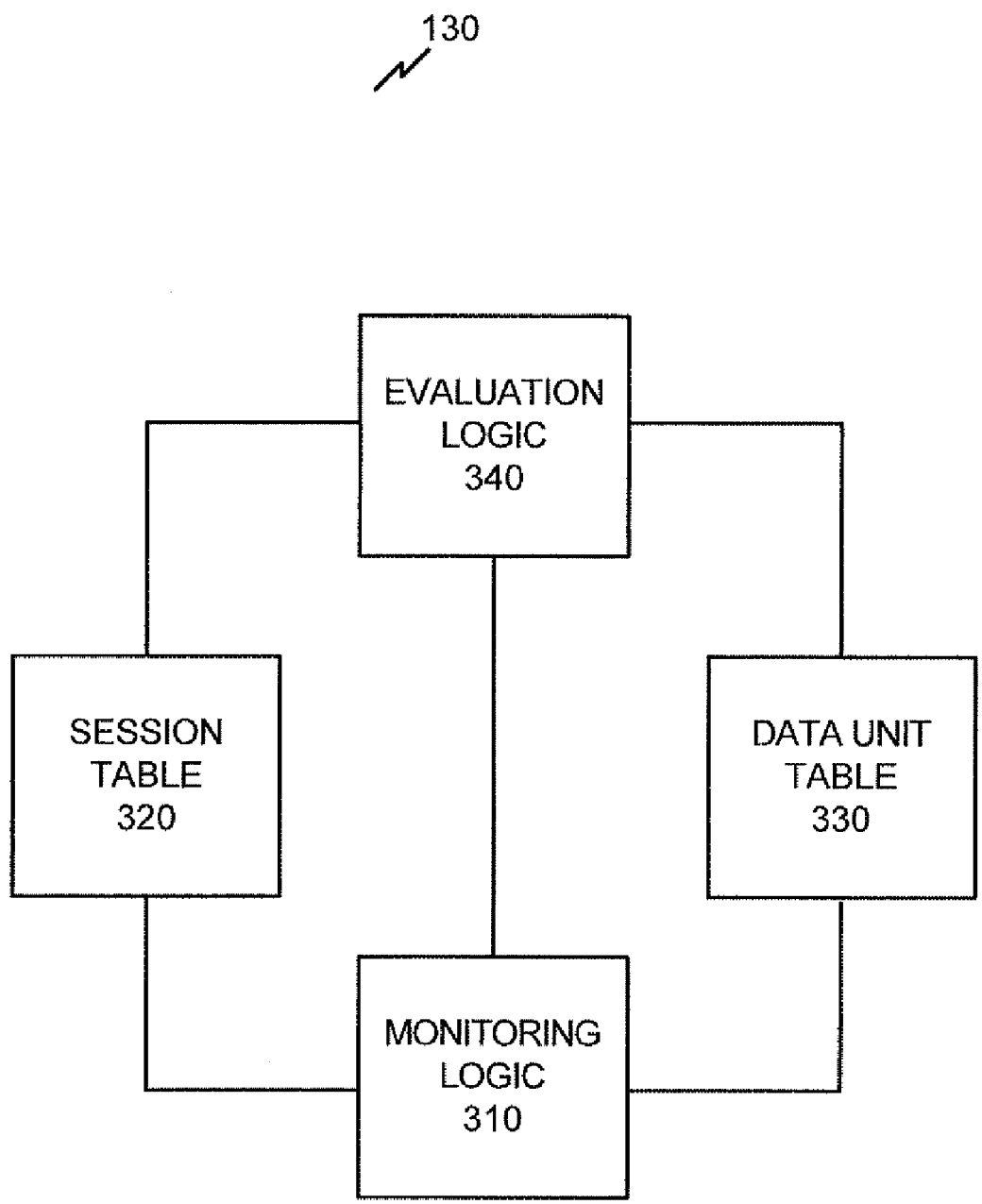
FIG. 3 illustrates an exemplary functional diagram of logic that can be used to perform sequence number checking in a network device consistent with the principles of the invention.

FIG. 3 illustrates an exemplary functional diagram of logic that can be used to perform sequence number checking in network device 130 consistent with the principles of the invention. The functional logic illustrated in FIG. 3 may be implemented in one or more components of FIG. 2, such as processor 220 and one or more memories 230, 240 and 250. The implementation of FIG. 3 may include monitoring logic 310, session table 320, data unit table 330, and evaluation logic 340. The implementation of FIG. 3 is illustrative and other implementations may include more or fewer functional components than are shown in FIG. 3.

Monitoring logic 310 may monitor data units passing through a device, such as network device 130. For example, monitoring logic 310 may include an interface that can determine when a data unit passes through network device 130 en route to a destination. Monitoring logic 310 may also be configured to extract information about a data unit passing through network device 130. For example, monitoring logic 310 may extract information about a source address, destination address, data unit size, acknowledgement number, sequence number, data unit type, etc. Monitoring logic 310 may provide extracted information to session table 320, data unit table 330, evaluation logic 340, or to other components in network device 130 or components located elsewhere in network 100.

Session table 320 may include a data structure configured to retain information about a communication session between a source device, such as client 110, and a destination device, such as server 140. Implementations of session table 320 may be arranged in a row and column format to facilitate conveying information in session table 320 to an operator or for use by another processing device. Session table 320 may include information such as acknowledgement numbers for the source device and/or destination device, window sizes for the source device and/or destination device, and maximum window sizes for the source device and/or the destination device. Information in session table 320 may be used by network device 130 to perform sequence number checking and/or acknowledgement number checking.

Data unit table 330 may include a data structure configured to retain information regarding data units passing through network device 130. For example, data unit table 330 may receive information about data units sent from client 110 to server 140 and for data units sent from server 140 to client 110. In one implementation, data unit table 330 may store information associated with a time value related to a data unit, a sender of a data unit, a sequence number for a data unit, a window size for a data unit, a result for a sequence number check related to a data unit, and/or information about whether session table 320 should be updated with new information regarding a data unit.

Evaluation logic 340 may include logic to perform operations related to data units passing through network device 130. In one implementation, evaluation logic 340 may use information in session table 320 and/or data unit table 330 to perform operations with respect to data units en route to a destination device. For example, evaluation logic 340 may determine an upper limit for a window and a lower limit for a window using information from session table 320 and/or data unit table 330. Evaluation logic 340 may then determine whether a sequence number for a data unit falls between the lower window limit and the upper window limit. Evaluation logic 340 may allow the data unit to reach a destination device when the sequence number for the data unit falls within the window. In contrast, evaluation logic 340 may drop the data unit when the data unit's sequence number falls outside the window. Evaluation logic 340 may be configured to manipulate the window as a function of information related to a data unit. For example, the width of the window and/or center value of the window may change based on information related to the data unit. Changing aspects of the window, such as a lower window limit, an upper window limit, and a center value, may discourage guessing valid sequence numbers by parties that are not part of a legitimate communication session.

Exemplary Session Table

FIG. 4 illustrates an exemplary session table 320 that can be implemented via a data structure in a memory, such as memory 230. Session table 320 may include a time field 410, a client side acknowledgement number ($A_N$) 415, a client side window size ($W_N$) 420, a client side maximum window size ($M_N$) 425, a server side acknowledgement number ($A_{N'}$) 430, a server side window size ($W_{N'}$) 435, a server side maximum window size ($M_{N'}$) 440, and a scaling factor (SF) 445.

Time field 410 may include information that identifies a data unit and/or information that can be used to arrange the data unit with respect to other data units. For example, time field 410 may include information that represents a time when a data unit was sent from a source, passed through network device 130, or was received at a destination. Time field 410 may also include other types of information that can be used to order data units. For example, a first data unit may be grouped with a number, such as 01, a second data unit may be grouped with 02, and a third data unit may be grouped with 03. The numbers 01, 02, and 03 may be used to order data units, such as by placing a data unit grouped with 02 between a data unit grouped with 01 and a data unit grouped with 03.

$A_N$ 415 may include information that identifies an acknowledgement number used on behalf of a source device, such as client 110. For example, $A_N$ 415 may represent an acknowledgement number that client 110 may use to determine whether a data unit received from another device, such as server 140, is legitimate.

$W_N$ 420 may include information that identifies a window size at client 110. $W_N$ 420 may represent a number of bytes (the window) that client 110 is expecting from another device, such as server 140. For example, when $W_N$ 420 is set at 5 bytes on client 110, client 110 may expect data units that are 5 bytes or less in length.

$M_N$ 425 may include information that identifies a maximum window size at client 110. In one implementation, $M_N$ 425 may represent a maximum number of bytes that client 110 can receive without overflowing a buffer used to receive incoming data units. In one implementation, $M_N$ 425 may represent a largest data unit size that was seen by client 110. In other implementations, $M_N$ 425 may be set by client 110, network device 130, server 140, or another device in network 100.

$A_{N'}$ 430 may include information that identifies an acknowledgement number used on behalf of a destination device, such as server 140. For example, $A_{N'}$ 430 may represent an acknowledgement number that server 140 may use to determine whether a data unit received from a source device, such as client 110, is legitimate.

$W_{N'}$ 435 may include information that identifies a window size at server 140. $W_{N'}$ 435 may represent a number of bytes that server 140 is expecting from another device, such as client 110.

$M_{N'}$ 440 may include information that identifies a maximum window size at server 140. In one implementation, $M_{N'}$ 440 may represent a maximum number of bytes that server 140 can receive without overflowing a buffer used to receive incoming data units.

Scaling factor 445 may include information that identifies a scaling, or shifting, value that can be used to scale or shift one or more parameters in session table 320, such as $A_N$ 415, $W_N$ 420, $M_N$ 425, $A_{N'}$ 430, $W_{N'}$ 435, and $M_{N'}$ 440. In one implementation, scaling factor 445 may be a four bit value that can be used to scale $W_N$ 420 and $M_N$ 425. Scaling parameters in session table 320 may operate to tighten (reduce) or loosen (increase) a sequence number checking window. Assume that $W_N$ 420 has a value of 4 and that $M_N$ 425 has a value of 10. Further assume that scaling factor 445 has a value of 2. Still further assume, that $W_N$ 420, $M_N$ 425, and scaling factor 445 may be represented as binary values having a certain number of bits (e.g., $W_N$ 420 having a value of 4 is represented as 100 in binary). Scaling factor 445 may be applied to $W_N$ 420 to expand $W_N$ 420 from an initial value of 4 to a scaled value of 16 (the initial value of $W_N$ 420 is 100 and is shifted by two bits via scaling factor 445 having a value of 2 to become the scaled window size of 10000). When $M_N$ 425 is shifted by scaling factor 445, $M_N$ 425 may be shifted from an initial value of 10 to 40 (the initial value of $M_N$ 425 is 1010 and is shifted by two bits via scaling factor 445 having a value of 2 to become a scaled maximum window size of 101000). Scaling factor 445 having a value of zero may cause an initial window size (i.e., an unsealed window size) to be used.

Exemplary Data Unit Table

FIG. 5 illustrates an exemplary data unit table 330 that can be used to store information about data units related to a communication session consistent with the principles of the invention. Data unit table 330 may include a data structure configured to store information about data units sent to or received from a device on a network. For example, data unit table 330 may include data unit information for devices participating in a communication session. Data unit table 330 may be stored in network device 130 or elsewhere in network 100, such as in another network device. Information in data unit table 330 may be arranged in a row and column format to facilitate interpretation of information in data unit table 330 by an operator or for use by another processing device. In one implementation, data unit table 330 may include time field 510, sender field 520, sequence number field 530, data unit length field 540, acknowledgement number field 550, window size field 560, sequence number check result field 570 and update session table field 580.

Time field 510 may include information that identifies a data unit and/or information that can be used to arrange the data unit with respect to other data units.

Sender field 520 may include information that identifies a sender of a data unit used in a communication session between a sending device and a receiving device. For example, in a communication session, client 110 may be a sender when client 110 sends a data unit to server 140, and server 140 may be a sender when server 140 sends a data unit to client 110.

Sequence number field 530 may include information that identifies a sequence number related to a data unit sent by a sender identified in sender field 520. For example, a data unit sent from client 110 to server 140 at time 350 may have a sequence number of 349. A sequence number may be used by a receiving device to order data units. For example, client 110 may send a first data unit with a sequence number 01 and a second data unit with a sequence number of 02. If the second data unit arrives before the first data unit, a destination device may use the sequence numbers to determine that the first data unit should be placed before the second data unit. Sequence numbers may be assigned by devices involved in the communication session, such as client 110 or server 140, or may be assigned via another device, such as network device 130.

Data unit length field 540 may include information that identifies a size, or length, of a data unit. Information in data unit length field 540 may be represented in substantially any type of unit, such as bits, bytes, blocks, chunks, etc.

Acknowledgement number field 550 may include information that identifies an acknowledgement number related to a data unit. For example, client 110 may send data unit 350 with an acknowledgement number of 121.

Window size field 560 may include information that identifies a window size related to a data unit. For example, a receiving device may specify a window size in terms of bytes to a sending device. The window size may specify a number of bytes that the receiving device can receive at a time. The sending device may have to parse data that will be sent to the receiving device into portions that do not exceed the specified window size. A window size may be fixed for a communication session or may vary during a communication session. With respect to the exemplary data unit table 330 in FIG. 5, a data unit sent a time 350 may have to include 40 or fewer bytes based on window size field 560. Since the data unit length at time 350 is 4, the data unit at time 350 does not exceed the window size.

Sequence number check result field 570 may include information that identifies whether a data unit passed a sequence number checking process. For example, network device 130 may monitor data units passing between client 110 and server 140 during a communication session. Network device 130 may perform sequence number checking on data units passing therethrough to distinguish between illegitimate data units, such as data units sent from an adversary, and legitimate data units, such as data units sent from client 110 or server 140 as part of the communication session.

Update session table field 580 may include information that identifies whether session table 320 should be updated with information related to a data unit included in data unit table 330. For example, YES in update session table field 580 for time 350 may indicate that session table 320 should be updated with information related to the data unit identified by time 350.

Implementations may use information from session table 320 and/or data unit table 330 to perform operations that determine whether a data unit should be forwarded to a destination. For example, network device 130 may perform operations on a data unit sent from client 110 to server 140 to determine whether the data unit is a legitimate data unit that should be forwarded onto server 140. Network device 130 may forward the data unit to server 140 when the data unit is identified as legitimate. In contrast, network device 130 may drop the data unit when the data unit is determined to be illegitimate.

Exemplary Processing

Figure 6:
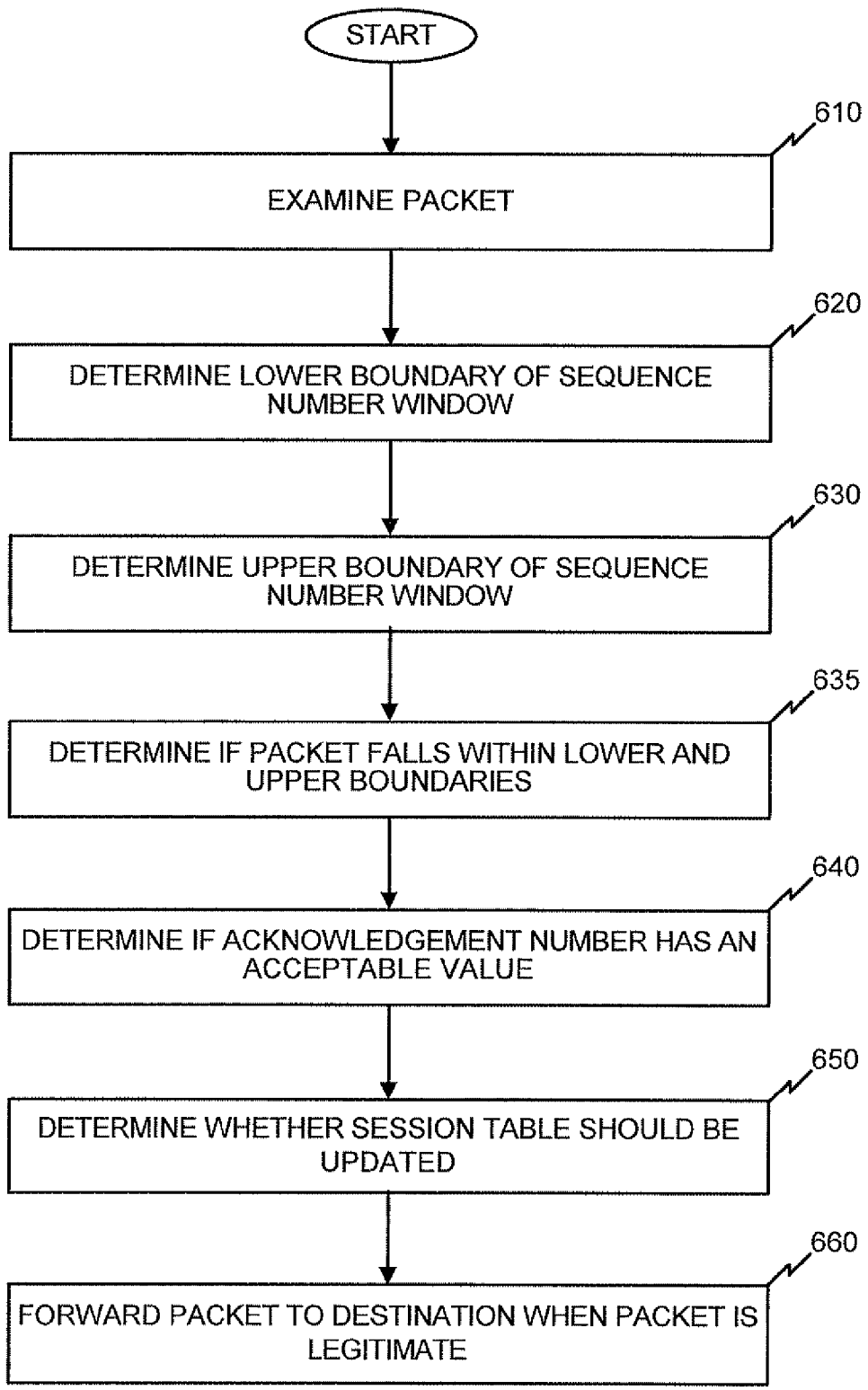
FIG. 6 illustrates exemplary processing that can be used to perform sequence number checking in a network device consistent with the principles of the invention.

FIG. 6 illustrates exemplary processing that can be used to perform sequence number checking in network device 130 consistent with the principles of the invention. Implementations may determine whether a data unit sent from a source should be forwarded to a destination. The determination may be made by establishing a window within which a sequence number of a legitimate data unit should fall. The window may be based on parameters associated with the data unit and/or devices involved in a legitimate communication session. Implementations of the window may not remain set at a fixed value through out a communication session. Since the window size and/or center value may vary, an adversary may be unlikely to guess a sequence number that falls within the window. As a result, the likelihood that an illegitimate data unit is mistaken for a legitimate data unit may be reduced and/or eliminated.

Client 110 and server 140 may wish to establish a communication session. For example, client 110 and server 140 may wish to establish a transmission control protocol (TCP) communication channel. Client 110 may send a data unit to server 140 as part of the communication session. For example, a TCP packet may be sent from client 110 through network device 130 en route to server 140. "Packet," as used in connection with FIG. 6, is representative of a type of data unit that can be used with an implementation of the invention. Implementations, such as those discussed in connection with FIG. 6, may also operate on other types of data units consistent with the principles of the invention.

Network device 130 may examine the packet received from client 110 and may obtain information from the packet (act 610). In one implementation, monitoring logic 310 may copy information from the packet and may insert the copied information into session table 320 that can be maintained at network device 130. For example, monitoring logic 310 may insert a packet time value 410, an acknowledgement number $A_N$ 415, a window size $W_N$ 420 and/or a maximum window size $M_N$ 430 into session table 320. Network device 130 may populate session table 320 with information from one or more packets sent from client 110 to server 140, or vice versa, during a communication session.

Network device 130 may use information related to the examined packet to populate data unit table 330. For example, network device 130 may populate time field 510 with a time value for the packet, sender field 520 with sender information, such as a designation for client 110 or server 140, sequence number field 530 with a sequence number for the packet, length field 540 with information about a length of the packet in bytes, acknowledgement number field 550 with information about an acknowledgement number related to the packet, window size field 560 with information about a window size related to the packet in bytes, sequence number check result field 570 with information about a result of sequence number checking performed on the packet, and update session table field 580 with information indicating whether session table 320 should be updated with information related to the packet.

Network device 130 may operate on information obtained from the packet to determine whether the sequence number of the packet falls within a sequence number window that identifies a range of valid sequence numbers. Packets with valid sequence numbers may be identified as legitimate packets and may be forwarded to a destination by network device 130. In contrast, packets having invalid sequence numbers may be dropped by network device 130. In an exemplary implementation, network device 130 may identify a lower boundary of the sequence number window using $$A_N - M_N < \text{Seq}_{n+1} \tag{EQ. 1}$$

where $\text{Seq}_{n+1}$ is the sequence number of a respective packet passing through network device 130 (act 620). For example, sequence number field 530 may include values for $\text{Seq}_{n+1}$ with respect to packets identified in data unit table 330. Network device 130 may identify an upper boundary for the sequence number window using $$\text{Seq}_{n+1} + \text{Length}_{n+1} < A_N + W_N \tag{EQ. 2}$$

where $\text{Length}_{n+1}$ represents the packet length for a packet having sequence number $\text{Seq}_{n+1}$ (act 630). Network device 130 may then determine if the packet falls within the lower and upper boundaries (act 635). When the sequence number for a packet falls within the lower and upper boundaries, the sequence number is within a valid range.

When a packet falls within the window defined by EQ. 1 and EQ. 2, network device 130 may determine whether an acknowledgement number for the packet has an acceptable value using $$A_{n+1} < A_{N'} + W_{N'} \tag{EQ. 3}$$

where $A_{n+1}$ represents the acknowledgement number for the incoming packet, identified in field 550 of table 330 (act 640).

For example, using information in session table 320 and data unit table 330, the following results are obtained for a packet at time 350 using EQs 1-3

$$345-30<349 \text{(PASS)} \tag{EQ. 1}$$

$$349+4<345+25 \text{(PASS)} \tag{EQ. 2}$$

$$121<121+40 \text{(PASS)} \tag{EQ. 3}$$

Since the sequence number for the packet at time 350 falls within the window defined by EQ. 1 and EQ. 2, and since the acknowledgement number of the packet at time 350 passes the criteria of EQ. 3, the packet at time 350 may be identified as a legitimate packet and may be forwarded to server 140. EQs. 1-3, implemented with respect to the packet at time 350, are implemented via unsealed parameters in session table 320. If desired, scaled parameters, such as $W_N$ 420 and/or $M_N$ 425 may be implemented via scaling factor 445 consistent with the principles of the invention.

For a packet at time 360, the following results may be obtained using EQs 1-3

$$345-30<200 \text{(FAIL)} \tag{EQ. 1}$$

$$200+12<345+25 \text{(PASS)} \tag{EQ. 2}$$

$$112<121+40 \text{(PASS)} \tag{EQ. 3}$$

Since the sequence number of the packet at time 360 does not fall within the window defined by EQ. 1 and EQ. 2, the packet at time 360 may not be considered legitimate and may be dropped by network device 130. As a result, the packet at time 360 may not reach server 140.

For a packet at time 375 that is sent from server 140 to client 110, the following results may be obtained using EQs 1-3

$$121-40<118 \text{(PASS)} \tag{EQ. 1}$$

$$118+20<121+40 \text{(PASS)} \tag{EQ. 2}$$

$$344<345+25 \text{(PASS)} \tag{EQ. 3}$$

Since the packet at time 375 is sent from server 140 to the client 110, $A_{N'}$, $W_{N'}$, and $M_{N'}$ are found on the left portion of session table 320, e.g., in columns 415, 420 and 425, respectively. Since the sequence number for the packet at time 375 falls within the window defined by EQ. 1 and EQ. 2, and since the acknowledgement number of the packet at time 375 passes the criteria of EQ. 3, the packet at time 375 may be identified as a legitimate packet and may be forwarded to client 110.

When information related to a packet meets the criteria established by EQs. 1-3, network device 130 may determine whether session table 320 should be updated with information related to the packet (act 650). For example, network device 130 may determine whether a last updated acknowledgement number by a sender of the packet ($A_{N'}$) should be updated and/or whether a maximum window size related to the packet ($M_{N'}$) should be updated. With respect to the packet at time 350, network device 130 may determine whether $$A_{n+1}>A_{N'} \tag{EQ. 4}$$

When the relationship of EQ. 4 is satisfied, network device 130 may update $A_{N'}$ in session table 320 for the packet at time 350. In one implementation, network device 130 may be configured to update $W_{N'}$ with a current value of $W_N$ when $A_{N'}$ is updated.

Network device 130 may determine whether a maximum window size ($M_{N'}$) should be updated. Network device 130 may determine whether $$W_{n+1}>M_{N'} \tag{EQ. 5}$$

where $W_{n+1}$ is the new window size of a packet. Network device 130 may be configured to update session table 320 when the relationship of EQ. 5 is satisfied.

Network device 130 may forward a packet to a destination when the relationships of EQs. 1-3 are met (act 660). When information related to a packet satisfies the relationships of EQs. 1-3, a sequence number and/or acknowledgement number for the packet may be determined to be legitimate. Network device 130 may be configured to forward only those packets having legitimate sequence numbers and/or acknowledgment numbers to a destination.

Conclusion

Systems and methods consistent with the principles of the invention provide techniques for determining whether sequence numbers are associated with legitimate traffic by determining whether the sequence numbers fall within a sequence number window having an upper limit and a lower limit. The size and location of the sequence number window may change during a communication session, thus making it more difficult for an adversary to guess a valid sequence number that falls within the sequence number window.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 6 the order of the acts may be varied in other implementations consistent with the present invention. Moreover, non-dependent acts may be implemented in parallel.

Also, network and system implementations have been illustrated and described using a single network device, server, client and network. However, in other implementations, networks and systems may include multiple devices and may further include additional devices, such as routers, intrusion detection systems (IDSs), service gateways, proxy servers, and the like. In addition, devices, such as firewalls, may employ multiple interfaces or ports for receiving and sending data units.

While exemplary implementations have been described herein, the processing performed by one of the devices described above may be performed by another device. For example, the processing performed by network device 130 and server 140 may be performed by a single device in alternative implementations. Therefore, implementations consistent with the principles of the invention are not necessarily limited to a particular configuration.

Moreover, it will be apparent to one of ordinary skill in the art that aspects of the invention, as described above, may be implemented in many different forms of software, firmware, and hardware in the implementations illustrated in the figures. The actual software code, or specialized control hardware, used to implement aspects consistent with the principles of the invention is not limiting of the present invention. Thus, the operation and behavior of the aspects were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A device, comprising:
    a processor to implement logic to:
        receive a data unit intended for a destination device,
        obtain information from the data unit, where the obtained information includes a source side acknowledgement number, a source side window size, a maximum window size, a data unit sequence number, a data unit acknowledgement number, a data unit length value, a destination side acknowledgement number, and a destination side window size,
        determine whether the data unit sequence number is greater than the source side acknowledgement number minus the maximum window size,
        determine whether a sum of the data unit sequence number and the data unit length value is less than a sum of the source side acknowledgement number and the source side window size,
        determine whether the data unit acknowledgement number is less than a sum of the destination side acknowledgement number and the destination side window size, and
        forward the data unit to the destination device when the data unit acknowledgement number is less than the sum of the destination side acknowledgement number and the destination side window size,
        the sum of the data unit sequence number and the data unit length value is less than the sum of the source side acknowledgement number and the source side window size, and
        the data unit acknowledgement number is less than the sum of the destination side acknowledgement number and the destination side window size.

2. The device of claim 1, where the obtained information is stored in a session table.

3. The device of claim 1, further comprising:
    a storage device to store a data structure comprising device information on behalf of a source device or the destination device.

4. The device of claim 1, where the processor is further to implement the logic to:
    determine whether to update the destination side acknowledgement number using the data unit acknowledgement number; and
    update the destination side acknowledgement number when it is determined to update the destination side acknowledgement number.

5. The device of claim 1, where the processor is further to implement the logic to:
    determine whether to change the destination side maximum window size based on the data unit window size; and
    change the destination side maximum window size when it is determined to change the destination side maximum window size.

6. A method performed by a device, the method comprising:
    receiving, at a processor of the device, a data unit on behalf of a destination device;
    obtaining, by the processor, a source side acknowledgement number related to a source device, a source side window size related to the source device, a maximum window size, a data unit sequence number, a data unit acknowledgement number, a data unit length value, a destination side acknowledgement number related to the destination device, and a destination side window size related to the destination device; and
    forwarding, by the processor, the data unit to the destination device when the data unit sequence number is greater than the source side acknowledgement number minus the maximum window size,
    a sum of the data unit sequence number and the data unit length value is less than a sum of the source side acknowledgement number and the source side window size, and
    the data unit acknowledgement number is less than the sum of the destination side acknowledgement number and the destination side window size.

7. The method of claim 6, further comprising:
    determining whether to update the destination side acknowledgement number based on an acknowledgement number in the data unit; and
    updating the destination side acknowledgement when a determination is made to update the destination side acknowledgement.

8. The method of claim 6, further comprising:
    determining whether to change a destination side maximum window size based on a data unit window size related to the data unit; and
    changing the destination side maximum window size when a determination is made to change the destination side maximum window size.

9. The method of claim 6, further comprising:
    maintaining a data structure on behalf of the source device or the destination device, where the data structure includes information used to determine whether the data unit should be forwarded to the destination.

10. The method of claim 6, further comprising:
    maintaining a session table on behalf of the destination device or the source device, where the session table includes information associated with a communication session between the source device and the destination device.

11. The method of claim 6, where the obtaining comprises obtaining information related to a transmission control protocol (TCP) channel established between the source device and the destination device.

12. A network device, comprising:
    a processor to:
        receive a data unit on behalf of a destination device;
        obtain a source side acknowledgement number, a source side window size, a maximum window size, a data unit sequence number, a data unit acknowledgement number, a data unit length value, a destination side acknowledgement number, and a destination side window size;

forward the data unit to the destination device when the data unit sequence number is greater than the source side acknowledgement number minus the maximum window size, a sum of the data unit sequence number and the data unit length value is less than a sum of the source side acknowledgement number and the source side window size, and the data unit acknowledgement number is less than the sum of the destination side acknowledgement number and the destination side window size.

13. A device, comprising:

a processor to implement logic to:

establish a lower limit using information from a session table and a data unit, where the information includes a source side acknowledgement number, a source side window size, a maximum window size, a data unit sequence number, a data unit acknowledgement number, a data unit length value, a destination side acknowledgement number, and a destination side window size, and where the lower limit is established by subtracting the maximum window size from the source side acknowledgement number, establish an upper limit using information from the session table and the data unit, where the lower limit does not equal the upper limit and where the upper limit is established by summing the source side acknowledgement number and the source side window size, determine whether a sequence number for the data unit is between the lower limit and the upper limit, determine whether the data unit acknowledgement number is less than a sum of the destination side acknowledgement number and the destination side window size, and forward the data unit to a destination when the sequence number is between the lower limit and the upper limit and when the data unit acknowledgement number is less than the sum of the destination side acknowledgement number and the destination side window size.

14. The device of claim 13, where a scaling factor is applied to establish the lower limit or to establish the upper limit.

* * * * *

UNITED STATES PATENT AND TRADEMARK OFFICE
CERTIFICATE OF CORRECTION

| | | |
|---|---|---|
| PATENT NO. | : 7,990,861 B1 | Page 1 of 1 |
| APPLICATION NO. | : 11/278475 | |
| DATED | : August 2, 2011 | |
| INVENTOR(S) | : Xiangdong Jin et al. | |

It is certified that error appears in the above-identified patent and that said Letters Patent is hereby corrected as shown below:

Claim 12, Column 15, Line 3 should read: "window size; and"

Signed and Sealed this
Eighth Day of November, 2011

David J. Kappos
*Director of the United States Patent and Trademark Office*